United States Patent
Suzuki (10) Patent No.: US 10,457,319 B2
(45) Date of Patent: Oct. 29, 2019

(54) CONTROL CIRCUIT THAT PERFORMS A FEEDBACK CONTROL OPERATION TO CONTROL AN OBJECT

(71) Applicant: KABUSHIKI KAISHA TOSHIBA, Tokyo (JP)

(72) Inventor: Yoshihide Suzuki, Hachioji Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 204 days.

(21) Appl. No.: 15/046,176

(22) Filed: Feb. 17, 2016

(65) Prior Publication Data

US 2016/0357161 A1    Dec. 8, 2016

(30) Foreign Application Priority Data

Jun. 8, 2015  (JP) ................... 2015-115553

(51) Int. Cl.
  *B62D 5/04*  (2006.01)
  *G05B 6/02*  (2006.01)

(52) U.S. Cl.
  CPC ............. *B62D 5/0466* (2013.01); *G05B 6/02* (2013.01)

(58) Field of Classification Search
  CPC ....................................... G05B 6/02
  See application file for complete search history.

(56) References Cited

U.S. PATENT DOCUMENTS

| 6,112,846 A | 9/2000 | Mukai et al. | |
| 2004/0066238 A1* | 4/2004 | Dickmann | G06F 1/26 331/16 |
| 2005/0065685 A1* | 3/2005 | Hamamoto | B62D 5/0466 701/41 |
| 2008/0306655 A1* | 12/2008 | Ukai | B62D 5/046 701/42 |

FOREIGN PATENT DOCUMENTS

| JP | S58-140807 A | 8/1983 |
| JP | H02-015302 A | 1/1990 |
| JP | H07200067 A | 8/1995 |
| JP | 2002291270 A | 10/2002 |
| JP | 2008167602 A | 7/2008 |

OTHER PUBLICATIONS

Japanese Office Action dated Jun. 26, 2018, filed in counterpart Japanese Patent Application No. 2015-115553 (7 pages) (with machine translation).

* cited by examiner

*Primary Examiner* — Ajay Ojha (74) *Attorney, Agent, or Firm* — Kim & Stewart LLP (57) ABSTRACT

A control circuit includes a proportional control unit configured to calculate a proportional value of a difference between an operating value fed back from an object to be controlled and a target value, as a first output value, an integration unit including a suppressing section, the integration unit configured to calculate an integrated value by adding the difference and a previously-calculated integrated value as processed by the suppressing section, and a second output value based on the integrated value, and an output unit configured to output, to the object, a control signal having a value based on the first and second output values. The suppressing section modifies the previously-calculated integrated value to be in a predetermined range if the previously-calculated integrated value is outside the predetermined range.

20 Claims, 8 Drawing Sheets

CONTROL CIRCUIT THAT PERFORMS A FEEDBACK CONTROL OPERATION TO CONTROL AN OBJECT

CROSS-REFERENCE TO RELATED APPLICATION

This application is based upon and claims the benefit of priority from Japanese Patent Application No. 2015-115553, filed Jun. 8, 2015, the entire contents of which are incorporated herein by reference.

FIELD

Embodiments described herein relate generally to a control circuit, in particular, a control circuit that performs a feedback control operation to control an object.

BACKGROUND

There are many control operations to control an object, including a feedback control. One of the feedback control techniques is known as proportional-integral-derivative (PID) control. PID control includes the following control elements: a proportional element that performs a proportional operation, an integral element that performs an integral operation, and a differential element that performs a differential operation.

When PID control is performed, an overshoot and an undershoot may occur. Such an overshoot and an undershoot may need to be compensated.

DETAILED DESCRIPTION

An embodiment provides a control circuit that suppresses the overshoot and the undershoot when carrying out feedback control.

In general, according to an embodiment, a control circuit includes a proportional control unit configured to calculate a proportional value of a difference between an operating value fed back from an object to be controlled and a target value, as a first output value, an integration unit including a suppressing section, the integration unit configured to calculate an integrated value by adding the difference and a previously-calculated integrated value as processed by the suppressing section, and a second output value based on the integrated value, and an output unit configured to output, to the object, a control signal having a value based on the first and second output values. The suppressing section modifies the previously-calculated integrated value to be in a predetermined range if the previously-calculated integrated value is outside the predetermined range.

Hereinafter, embodiments will be described with reference to the drawings. In the drawings, the same or equivalent elements will be depicted with the same characters.

First Embodiment

Figure 1:
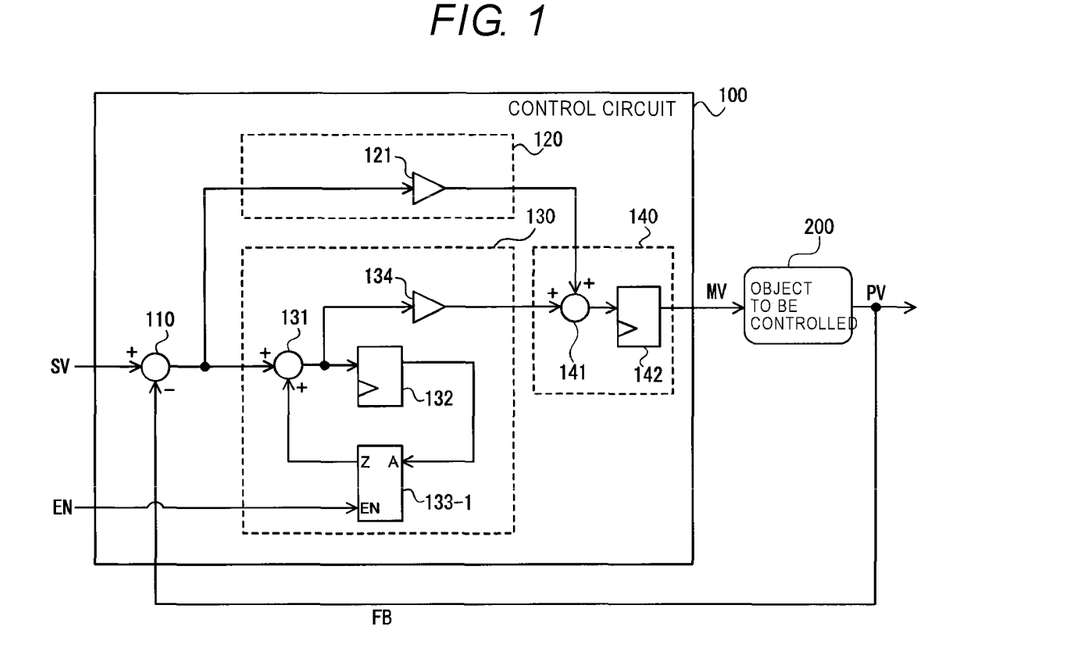
FIG. 1 is a block diagram of a control circuit according to a first embodiment.

FIG. 1 is a block diagram of a control circuit 100 according to a first embodiment. The control unit 100 is a PID control unit. PID control includes a control operation carried out by at least one of the following control elements: a proportional element (P element) that performs a proportional operation, an integral element (I element) that performs an integral operation, and a differential element (D element) that performs a differential operation. The PID control includes not only a control operation carried out by all of the P element, the I element, and the D element, but also a control operation carried out by only some of the control elements. Hereinafter, the control unit 100 that performs the PID control will be described.

The control unit 100 is connected to an object 200 to be controlled, which is a motor, for example. The control unit 100 changes a value of an operation output MV in such a way that a value of a control output PV becomes a target value SV. The operation output MV is an input of the object 200 to be controlled, and the control output PV is an output of the object 200 to be controlled. For example, the value of the operation output MV is a value of voltage applied to the motor, and the value of the control output PV is the number of revolutions of the motor. The value of the control output PV is fed back to the control unit 100. The target value SV is an indicated value which is an output target of the object to be controlled and is input to the control unit 100 from the outside.

The control unit 100 includes a difference calculator 110, a proportional controlling section 120, an integral controlling section 130, and an outputting section 140.

The difference calculator 110 calculates a difference (hereinafter referred to as deviation) between the value of the fed-back control output PV (hereinafter referred to as feedback value FB) and the target value SV. Then, the difference calculator 110 outputs the deviation to the proportional controlling section 120 and the integral controlling section 130.

The proportional controlling section 120 performs a proportional operation. The proportional controlling section 120 includes an amplifier 121. The amplifier 121 amplifies the deviation and outputs the amplified deviation to the outputting section 140. The amplification factor of the amplifier 121 is set by the user in advance. The amplification factor may be smaller than 1 or may be greater than 1.

The integral controlling section 130 performs an integral operation. The integral controlling section 130 includes an adder 131, a register 132, a suppressing section (modification section) 133-1, and an amplifier 134.

The adder 131 adds an output of the suppressing section 133-1 and the deviation. The value obtained by addition is the cumulative value of the deviation. The adder 131 outputs the cumulative value to the register 132 and the amplifier 134.

The register 132 stores the cumulative value of the deviation. The register 132 is formed of a flip-flop, for example. To the register 132, a clock signal having a fixed period is input. The register 132 receives in the input data at the rising edge of the clock signal, for example. In the following description, the operational period (for example, the period of the clock signals which are input to the register 132) of the register 132 is referred to as a PID period.

The suppressing section 133-1 modifies the cumulative value. The suppressing section 133-1 includes an input terminal A, an output terminal Z, and an enable signal input terminal EN. To the input terminal A, the cumulative value output from the register 132 is input. Moreover, from the output terminal Z, the cumulative value input from the input terminal A or the cumulative value modified in accordance with a previously set standard is output. To the enable signal input terminal EN, an enable signal which is supplied from the outside is input. The enable signal is input when the target value SV is input to the control unit 100.

Figure 2:
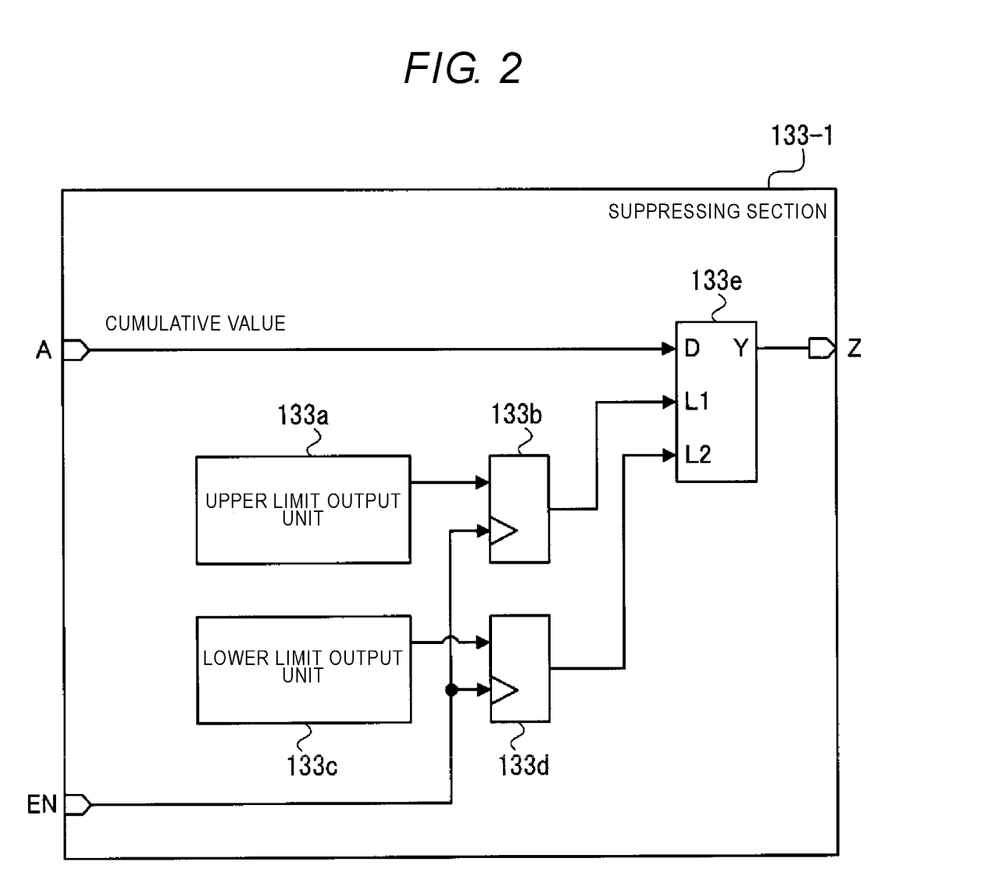
FIG. 2 is a block diagram of a suppressing section of the control circuit according to the first embodiment.

FIG. 2 is a block diagram of the suppressing section 133-1. The suppressing section 133-1 includes an upper limit output circuit 133a, a register 133b, a lower limit output circuit 133c, a register 133d, and a limiter circuit 133e.

The upper limit output circuit 133a outputs, to the register 133b, an upper limit value of the cumulative value. The upper limit value may be a value determined based on the detected value or the like of an unillustrated sensor attached to the object 200 to be controlled or a fixed value. Here, it is assumed that the upper limit is a positive fixed value set by the user or the like in advance.

The register 133b is formed of a flip-flop, for example, and stores the upper limit value output from the upper limit output circuit 133a. To the register 133b, the enable signal is input. The register 133b receives the upper limit when, for example, the enable signal becomes active. The register 133b outputs the received upper limit value to the limiter circuit 133e.

The lower limit output circuit 133c outputs, to the register 133d, a lower limit value of the cumulative value. The lower limit value may be a value determined based on the detected value or the like of an unillustrated sensor attached to the object 200 to be controlled or a fixed value. Here, it is assumed that the lower limit is a negative fixed value set by the user or the like in advance.

The register 133d is formed of a flip-flop, for example, and stores the lower limit value. To the register 133d, the enable signal is input. The register 133d receives the lower limit value when, for example, the enable signal becomes active.

The limiter circuit 133e is formed of a multiplexer, for example, and modifies the cumulative value. The limiter circuit 133e includes three input terminals D, L1, and L2 and an output terminal Y. To the input terminal D, the cumulative value is input from the register 132. Moreover, to the input terminal L1, the upper limit value is input from the register 133b, and, to the input terminal L2, the lower limit value is input from the register 133d.

The limiter circuit 133e compares the cumulative value with the upper limit value and the lower limit value. Depending on the result of comparison, the limiter circuit 133e operates as follows, for example. If the cumulative value is greater than the upper limit value, the limiter circuit 133e outputs the upper limit value from the output terminal Y as a new cumulative value. If the cumulative value is smaller than the lower limit value, the limiter circuit 133e outputs the lower limit value from the output terminal Y as a new cumulative value. Moreover, if the cumulative value is equal to or greater than the lower limit value and equal to or smaller than the upper limit value, the limiter circuit 133e outputs the cumulative value from the output terminal Y. The cumulative value from the output terminal Y is output from the output terminal Z.

The amplifier 134 amplifies the output (cumulative value) of the adder 131 and outputs the amplified output to the outputting section 140. The amplification factor of the amplifier 134 is set by the user in advance. The amplification factor may be smaller than 1 or may be greater than 1.

The outputting section 140 generates the amount of operation MV based on the output value of the proportional controlling section 120 and the output value of the integral controlling section 130. The outputting section 140 includes an adder 141 and a register 142.

The adder 141 outputs, to the register 142, a value obtained by adding the output value of the proportional controlling section 120 and the output value of the integral controlling section 130.

The register 142 is formed of a flip-flop, for example, and stores the value output from the adder 141. The register 142 receives the value at timing which is synchronous with the register 132. The register 142 outputs the received value to the object 200 to be controlled as the value of operation output MV.

Next, an operation of the control unit 100 will be described.

First, an operation performed by the control unit 100 to suppress an overshoot will be described.

If the target value SV which is greater than the value of the current control output PV is input to the control unit 100, since there is a difference between the target value SV and the feedback value FB, the proportion of the output value of the proportional controlling section 120 with respect to the value of operation output MV is high. When the feedback value FB gets closer to the target value SV, the proportion of the output value of the proportional controlling section 120 with respect to the value of operation output MV is decreased and the proportion of the output value of the integral controlling section 130 with respect to the value of operation output MV is increased.

If the integral controlling section 130 does not include the suppressing section 133-1, even when the feedback value FB reaches the target value SV, the output value of the integral controlling section 130 would not be instantaneously reduced to zero. As a result, the control output PV may overshoot. However, in the integral controlling section 130 according to the present embodiment, the overshoot is suppressed by the suppressing section 133-1.

The integral controlling section 130 accumulates the deviation between the target value SV and the feedback value FB by the adder 131. The cumulative value is stored in the register 132 and is fed back to the adder 131 via the suppressing section 133-1 after a lapse of the PID period. The suppressing section 133-1 compares the cumulative value input to the input terminal A with the upper limit value. If the cumulative value is greater than the upper limit value, the suppressing section 133-1 outputs the upper limit value from the output terminal Z as a new cumulative value. On the other hand, if the cumulative value is smaller than the upper limit value, the suppressing section 133-1 outputs the cumulative value from the output terminal Z. As a result, the output value of the integral controlling section 130 is limited to the upper limit value at maximum and an overshoot is suppressed.

Next, an operation performed by the control unit 100 to suppress an undershoot will be described.

If the target value SV which is smaller than the current control output PV is input to the control unit 100, since there is a difference between the target value SV and the feedback value FB, the proportion of the output value of the proportional controlling section 120 with respect to the value of operation output MV is high. When the feedback value FB is decreased and gets closer to the target value SV, the output value of the proportional controlling section 120 gets closer to zero, and the output value of the integral controlling section 130 is increased in a negative direction.

If the integral controlling section 130 does not include the suppressing section 133-1, even when the feedback value FB reaches the target value SV, the output value of the integral controlling section 130 would not be instantaneously reduced to zero. As a result, the control output PV may undershoot. However, in the integral controlling section 130 according to the present embodiment, the undershoot is suppressed by the suppressing section 133-1.

The integral controlling section 130 accumulates the deviation between the target value SV and the feedback value FB by the adder 131. The cumulative value is stored in the register 132 and is fed back to the adder 131 via the suppressing section 133-1 after a lapse of the PID period. The suppressing section 133-1 compares the cumulative value input to the input terminal A with the lower limit value stored in the suppressing section 133-1. If the cumulative value is smaller than the lower limit value, the suppressing section 133-1 outputs the lower limit value from the output terminal Z as a new cumulative value. On the other hand, if the cumulative value is greater than the lower limit value, the suppressing section 133-1 outputs the cumulative value from the output terminal Z. As a result, the output value of the integral controlling section 130 is limited to the lower limit value at minimum and an undershoot is suppressed.

Figure 3:
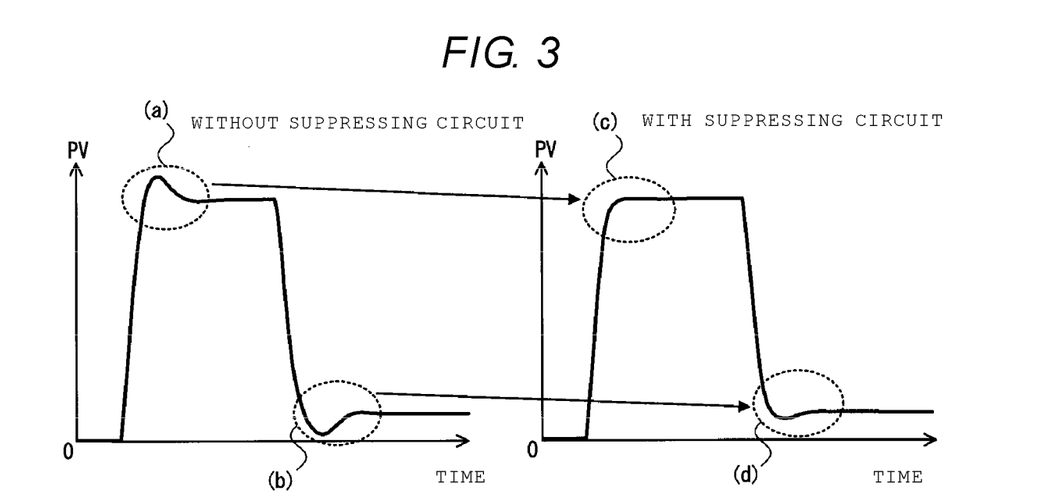
FIG. 3 illustrates values of a control output when overshoot and undershoot occur and when the overshoot and the undershoot are suppressed.

According to the present embodiment, since the integral controlling section 130 includes the suppressing section 133-1, an overshoot and an undershoot can be suppressed. FIG. 3 illustrates a state in which an overshoot and an undershoot are suppressed by the suppressing section 133-1. According to the present embodiment, an overshoot indicated in part (a) in FIG. 3 is suppressed in a manner as indicated in part (c), for example, and an undershoot indicated in part (b) is suppressed in a manner as indicated in part (d), for example.

Second Embodiment

Figure 4:
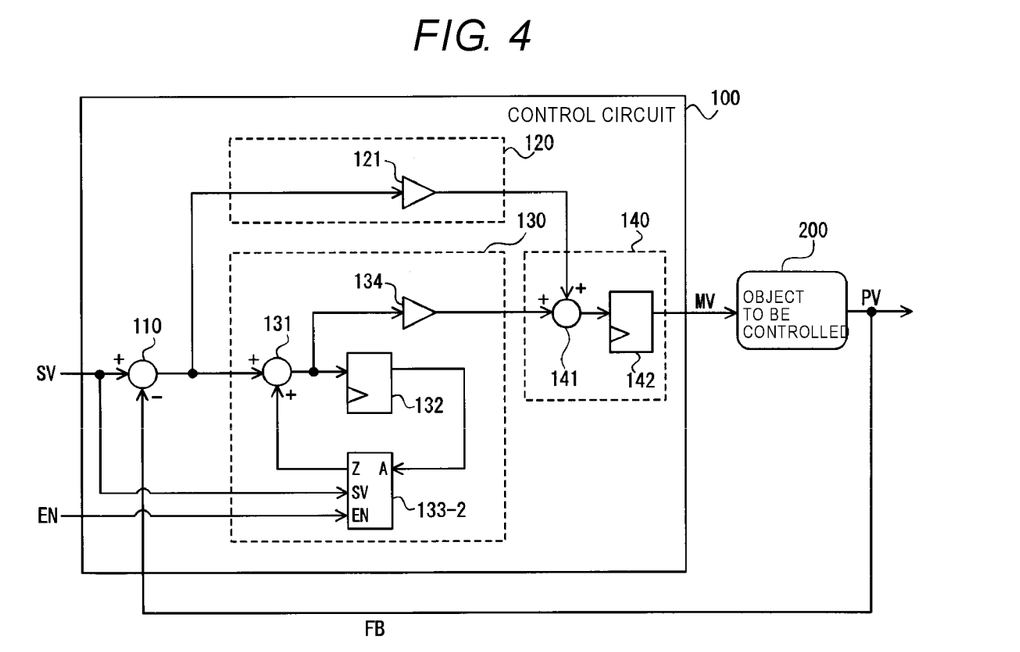
FIG. 4 is a block diagram of a control circuit according to a second embodiment.
Figure 5:
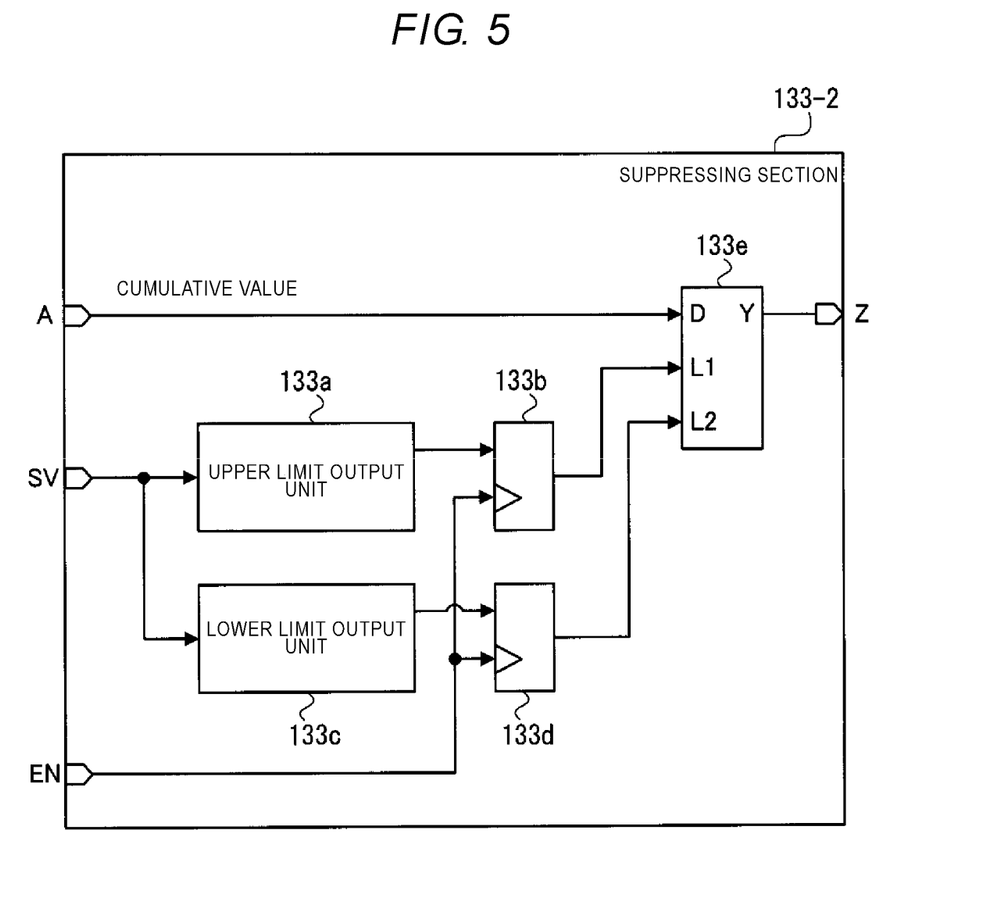
FIG. 5 is a block diagram of a suppressing section of the control circuit according to the second embodiment.

FIG. 4 is a block diagram of the control unit 100 according to a second embodiment. The control unit 100 according to the second embodiment differs from the control unit 100 according to the first embodiment in that the target value SV is input also to a suppressing section 133-2. FIG. 5 is a block diagram of the suppressing section 133-2. The target value SV is input to an upper limit output circuit 133a and a lower limit output circuit 133c.

The upper limit output circuit 133a calculates an upper limit value based on the target value SV. The upper limit output circuit 133a calculates a certain proportion of the target value SV, for example, a value obtained by adding 1% (+0.01) of the target value to the target value, as the upper limit value.

Likewise, the lower limit output circuit 133c calculates a lower limit value based on the target value SV. The lower limit output circuit 133c calculates a certain proportion of the target value SV, for example, a value obtained by subtracting 1% (−0.01) of the target value from the target value, as the lower limit value.

The configurations other than the upper limit output circuit 133a and the lower limit output circuit 133c are the same as the configurations of the first embodiment.

According to the present embodiment, since the upper limit value and the lower limit value are determined based on the target value SV, the absolute values of the upper limit value and the lower limit value do not become disproportionate values with respect to the target value SV. Therefore, the control unit 100 may suppress the overshoot and the undershoot with higher accuracy.

Third Embodiment

Figure 6:
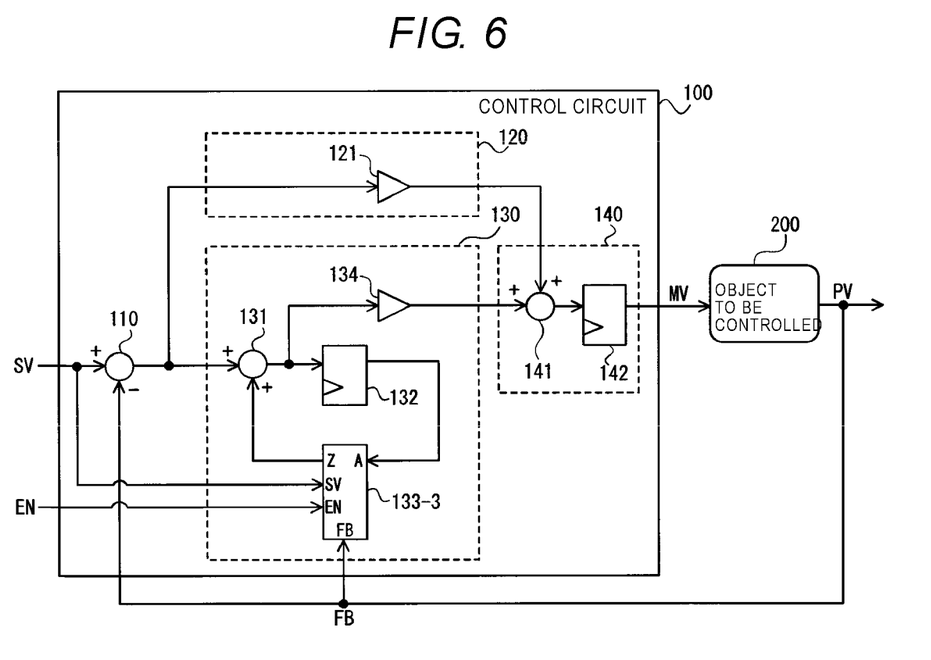
FIG. 6 is a block diagram of a control circuit according to a third embodiment.
Figure 7:
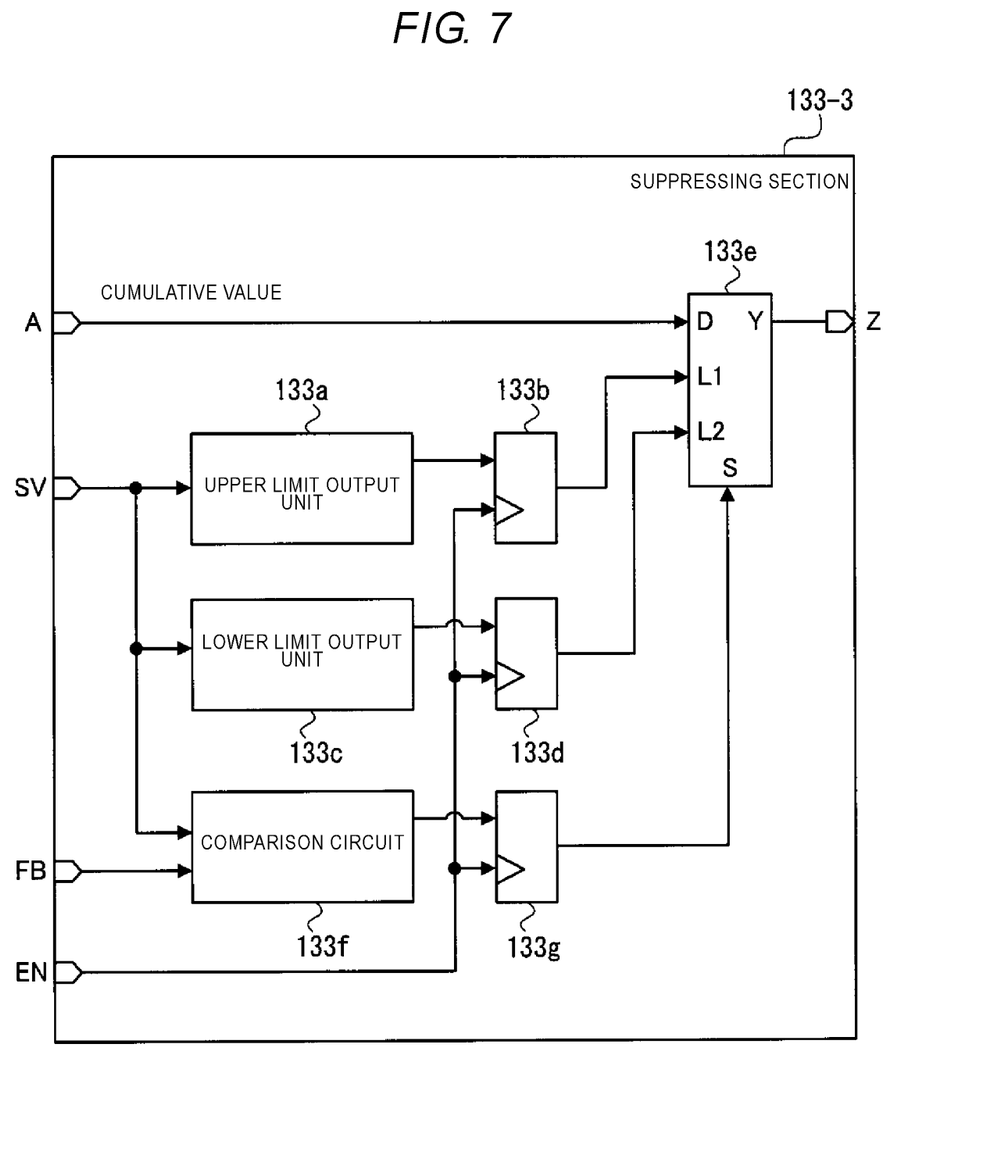
FIG. 7 is a block diagram of a suppressing section of the control circuit according to the third embodiment.

FIG. 6 is a block diagram of the control unit 100 according to a third embodiment. The control unit 100 according to the third embodiment differs from the control unit 100 according to the first embodiment in that the target value SV and the feedback value FB are input also to a suppressing section 133-3. FIG. 7 is a block diagram of the suppressing section 133-3. The target value SV is input to the upper limit output circuit 133a, the lower limit output circuit 133c, and a comparison circuit 133f, and the feedback value FB is input to the comparison circuit 133f.

The upper limit output circuit 133a outputs an upper limit value to the register 133b. The register 133b receives the upper limit value and outputs the upper limit value to the limiter circuit 133e. The lower limit output circuit 133c outputs a lower limit value to the register 133d. The register 133d receives the lower limit value and outputs the lower limit value to the limiter circuit 133e. The upper limit value and the lower limit value may be fixed values or values varying depending on the target value SV or the like.

The comparison circuit 133f compares the target value SV with the feedback value FB and outputs the comparison result (comparison value) to a register 133g. For example, the comparison value is "1" if the feedback value FB is greater than the target value SV and is "0" if the feedback value FB is smaller than the target value SV. Incidentally, if the feedback value FB and the target value SV are the same, the comparison value may be "1" or "0".

The register 133g is formed of a flip-flop, for example, and stores the comparison value. To the register 133g, the enable signal is input. The register 133g receives the comparison value when the enable signal becomes active.

The limiter circuit 133e is a circuit that limits the accumulation of the cumulative value. The limiter circuit 133e includes three input terminals D, L1, and L2, an output terminal Y, and a select terminal S. To the input terminal D, the cumulative value is input from the register 132. Moreover, to the input terminal L1, the upper limit value is input from the register 133b and, to the input terminal L2, the lower limit value is input from the register 133d. Furthermore, to the select terminal S, the comparison value is input from the register 133g.

If the comparison value is "1", that is, if the feedback value FB is greater than the target value SV, the limiter circuit 133e compares the cumulative value with the upper limit value. Then, if the cumulative value is greater than the upper limit value, the limiter circuit 133e outputs the upper limit value as an output Y. Otherwise (if the cumulative value is smaller than or equal to the upper limit value), the limiter circuit 133e outputs the cumulative value as the output Y.

On the other hand, if the comparison value is "0", that is, if the feedback value FB is smaller than the target value SV, the limiter circuit 133e compares the cumulative value with the lower limit value. Then, if the cumulative value is smaller than the lower limit value, the limiter circuit 133e outputs the lower limit value as the output Y. Otherwise (if the cumulative value is greater than or equal to the lower limit value), the limiter circuit 133e outputs the cumulative value as the output Y.

The operation of the limiter circuit 133e is written in the C language (a programming language) as follows. In the following description, D denotes a cumulative value, L1 denotes an upper limit value, L2 denotes a lower limit value, Y denotes an output value, and S denotes a comparison value. If S is 1, the feedback value FB is greater than the target value SV; if S is 0, the feedback value FB is smaller than the target value SV.

```
if (S==1) {
    if (D>L1)
        Y=L1;
    else
        Y=D;
}
else {
    if (D<L2)
        Y=L2;
    else
        Y=D;
}
```

According to the present embodiment, if the feedback value FB is greater than the target value SV, the suppressing section 133-3 makes only a determination as to whether or not the cumulative value is greater than the upper limit value. Then, if the cumulative value is greater than the upper limit value, the suppressing section 133-3 replaces the cumulative value with the upper limit value. That is, the suppressing section 133-3 limits the cumulative value to the upper limit value at the maximum if the integral controlling section 130 operates to increase the control output PV in spite of the fact that the feedback value FB is greater than the target value SV.

On the other hand, if the feedback value FB is smaller than the target value SV, the suppressing section 133-3 makes only a determination as to whether or not the cumulative value is smaller than the lower limit value. Then, if the cumulative value is smaller than the lower limit value at the minimum, the suppressing section 133-3 replaces the cumulative value with the lower limit value. That is, the suppressing section 133-3 limits the cumulative value to the lower limit value if the integral controlling section 130 operates to decrease the control output PV in spite of the fact that the feedback value FB is smaller than the target value SV.

As a result, in the integral controlling section 130, if an overshoot and an undershoot occur, the cumulative value is modified by the suppressing section 133-3. The control unit 100 may suppress an overshoot and an undershoot without affecting the rising/falling characteristics of PID control. As a result, the user may suppress the overshoot and the undershoot while maintaining the existing characteristics only by adding the suppressing section 133-3 to the existing control unit without the trouble of changing the parameters (for example, the amplification factors of the amplifier 121 and the amplifier 134) of PID control.

The above-described embodiment is a mere example and may be modified in various ways, and various applications thereof are possible. For example, the suppressing section 133-3 may limit the cumulative value by any one of the upper limit value and the lower limit value.

Figure 8:
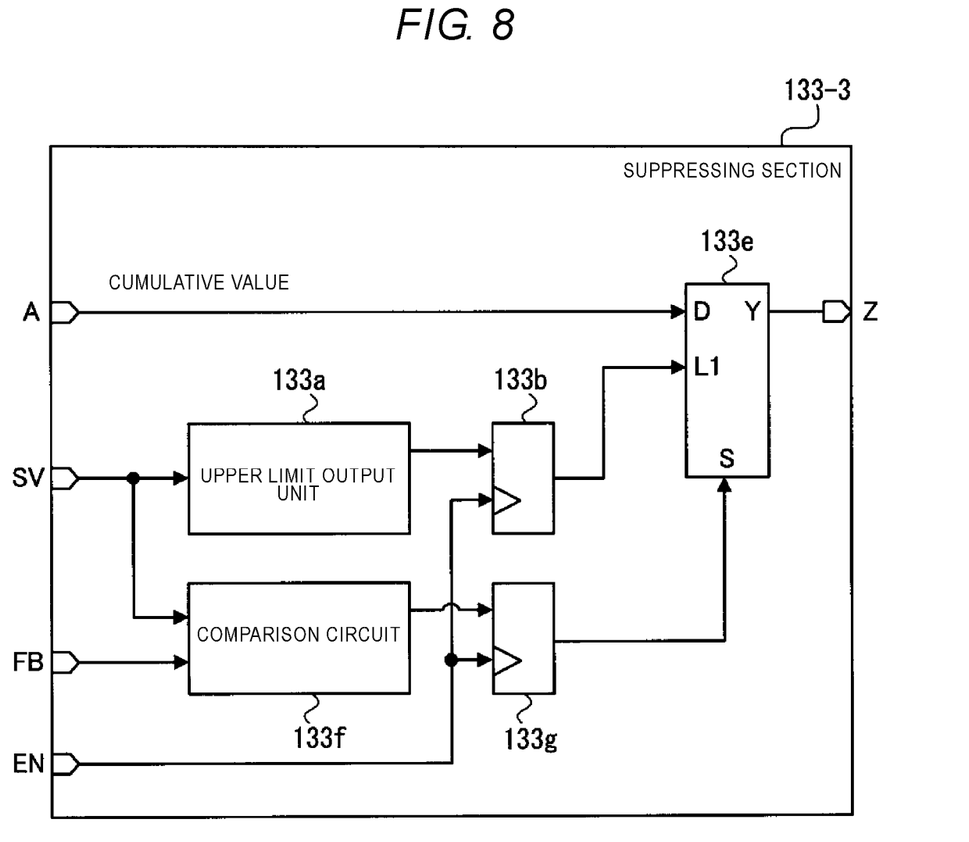
FIG. 8 is a block diagram of the suppressing section of the control circuit according to a modified example of the third embodiment.

FIG. 8 depicts an example of the suppressing section 133-3 that modifies the cumulative value only by the upper limit. More specifically, FIG. 8 is obtained by removing the lower limit output circuit 133c and the register 133d from the suppressing section 133-3 according to the third embodiment. In this case, if the feedback value FB is greater than the target value SV and the cumulative value is greater than the upper limit value, the suppressing section 133-3 changes the cumulative value to the upper limit value. If the feedback value FB is greater than the target value SV and the cumulative value is smaller than the upper limit value, the suppressing section 133-3 does not change the cumulative value. Moreover, if the feedback value FB is smaller than the target value SV, the suppressing section 133-3 does not change the cumulative value.

The operation by which the cumulative value is suppressed only by the upper limit value may also be applied to the suppressing sections 133-1 and 133-2 according to the first and second embodiments. In this case, if the cumulative value is greater than the upper limit, the suppressing sections 133-1 and 133-2 change the cumulative value to the upper limit value, and, if the cumulative value is smaller than the upper limit value, the suppressing sections 133-1 and 133-2 do not change the cumulative value.

Figure 9:
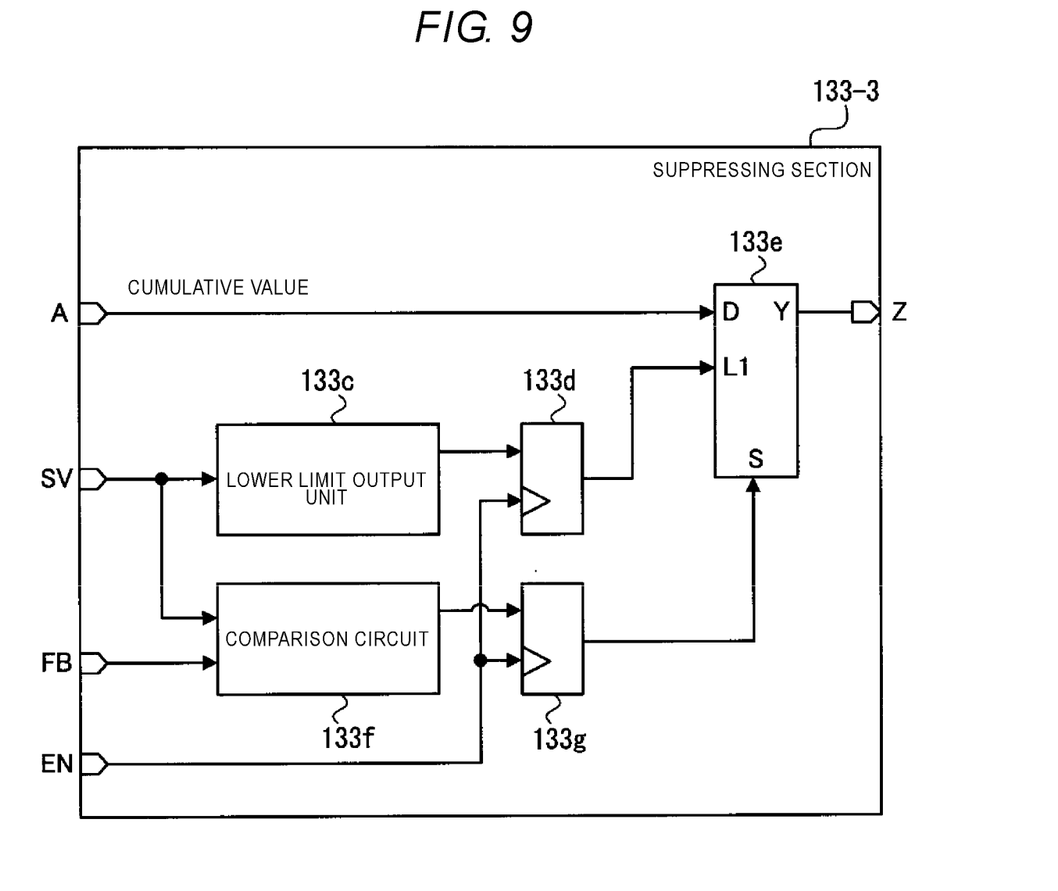
FIG. 9 is a block diagram of the suppressing section of the control circuit according to another modified example of the third embodiment.

FIG. 9 depicts an example of the suppressing section 133-3 that modifies the cumulative value only based on the lower limit value. More specifically, FIG. 9 is obtained by removing the upper limit output circuit 133a and the register 133b from the suppressing section 133-3 according to the third embodiment. In this case, if the feedback value FB is smaller than the target value SV and the cumulative value is smaller than the lower limit value, the suppressing section 133-3 changes the cumulative value to the lower limit value. If the feedback value FB is smaller than the target value SV and the cumulative value is greater than the lower limit value, the suppressing section 133-3 does not change the cumulative value. Moreover, if the feedback value FB is greater than the target value SV, the suppressing section 133-3 does not change the cumulative value.

The operation by which the cumulative value is modified only based on the upper limit value may also be applied to the suppressing sections 133-1 and 133-2 according to the first and second embodiments. In this case, if the cumulative value is smaller than the lower limit, the suppressing sections 133-1 and 133-2 change the cumulative value to the lower limit value, and, if the cumulative value is greater than the lower limit value, the suppressing sections 133-1 and 133-2 do not change the cumulative value.

Moreover, in the above-described third embodiment, the feedback value FB and the target value SV are input to the comparison circuit 133f and the comparison value is determined based on the result of comparison between the feedback value FB and the target value SV. However, a cumulative value A which is the output value of the register 132 and the target value SV may be input to the comparison circuit 133f and the comparison value may be determined based on the result of comparison between the cumulative value A and the target value SV.

Furthermore, in the embodiments described above, the control unit 100 includes only the proportional controlling section 120 corresponding to the P element and the integral controlling section 130 corresponding to the I element, but the control unit 100 may include a differential controlling section which corresponds to the D element and functions as a differential controlling unit. For example, the differential controlling section calculates a value which is output to the outputting section 140 based on the difference between the last deviation (the deviation before the PID period) and the current deviation. As the configuration of the differential controlling section, various known configurations may be used. In this case, the outputting section 140 outputs a value obtained by adding the output value of the proportional controlling section 120, the output value of the integral controlling section 130, and the output value of the differential controlling section as the value of operation output MV. As long as the control unit 100 includes the integral controlling section 130 including the suppressing section 133-1, 133-2, or 133-3, the configuration of the control unit 100 may be appropriately changed.

In addition, in the above-described embodiments, the suppressing sections 133-1, 133-2, and 133-3 are implemented as logic circuits. However, the suppressing sections 133-1, 133-2, and 133-3 may be configured as processors and the operations of the suppressing sections 133-1, 133-2, and 133-3 of the embodiments may be implemented by software. Likewise, the control unit 100 may be configured as a processor and the operations of the control unit 100 according to each embodiment may be implemented by software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control circuit, comprising:
   a difference calculator configured to calculate, upon receipt of an operating value output from an object to be controlled, a difference between the operating value and a target value, and output the difference;
   a proportional control unit configured to calculate, upon receipt of the difference from the difference calculator, a proportional value of the difference as a first output value;
   an integration unit including a suppressing section, the integration unit configured to:
      calculate, upon receipt of the difference from the difference calculator, an integrated value of the operating value by adding the difference and a modified previously-calculated integrated value, which is a previously-calculated integrated value modified by the suppressing section to be in a predetermined range if the previously-calculated integrated value is outside the predetermined range, and
      calculate a second output value based on the integrated value; and
   an output unit configured to:
      calculate, upon receipt of the first and second output values, a new operating value with the first and second output values, and
      output, to the object, a control signal having the new operating value.

2. The control circuit according to claim 1, wherein when the previously-calculated integrated value is greater than an upper limit value of the predetermined range, the suppressing section modifies sets the modified previously-calculated integrated value to be equal to the upper limit value.

3. The control circuit according to claim 2, wherein the upper limit value is determined based on the target value.

4. The control circuit according to claim 3, wherein the upper limit value is greater than the target value by a predetermined ratio of the target value.

5. The control circuit according to claim 1, wherein when the previously-calculated integrated value is smaller than a lower limit value of the predetermined range, the suppressing section sets the modified previously-calculated integrated value to be equal to the lower limit value.

6. The control circuit according to claim 5, wherein the lower limit value is determined based on the target value.

7. The control circuit according to claim 6, wherein the lower limit value is smaller than the target value by a predetermined ratio of the target value.

8. The control circuit according to claim 1, wherein when the operating value is greater than the target value and the previously-calculated integrated value is greater than an upper limit value of the predetermined range, the suppressing section sets the modified previously-calculated integrated value to be equal to the upper limit value.

9. The control circuit according to claim 1, wherein when the operating value is smaller than the target value and the previously-calculated integrated value is smaller than a lower limit value of the predetermined range, the suppressing section sets the modified previously-calculated integrated value to be equal to the lower limit value.

10. The control circuit according to claim 1, wherein the new operating value is calculated based on a sum of the first and second output values.

11. A method for controlling an object that is operated based on a control signal, the method comprising:
    receiving an operating value output from an object to be controlled;
    calculating a difference between the operating value and a target value;
    calculating, as a first output value, a proportional value of the difference;
    calculating an integrated value of the operating value by adding the difference and a modified previously-calculated integrated value, which is a previously-calculated integrated value modified to be in a predetermined range if the previously-calculated integrated value is outside the predetermined range, and calculating a second output value based on the integrated value;
    calculating a new operating value with the first and second output values; and
    outputting, to the object, a control signal having the new operating value.

12. The method according to claim 11, wherein when the previously-calculated integrated value is greater than an upper limit value of the predetermined range, the modified previously-calculated integrated value is set to be equal to the upper limit value.

13. The method according to claim 12, wherein the upper limit value is determined based on the target value.

14. The method according to claim 13, wherein
the upper limit value is greater than the target value by a predetermined ratio of the target value.

15. The method according to claim 11, wherein
when the previously-calculated integrated value is smaller than a lower limit value of the predetermined range, the modified previously-calculated integrated value is set to be equal to the lower limit value.

16. The method according to claim 15, wherein
the lower limit value is determined based on the target value.

17. The method according to claim 16, wherein
the lower limit value is smaller than the target value by a predetermined ratio of the target value.

18. The method according to claim 11, wherein
when the operating value is greater than the target value and the previously-calculated integrated value is greater than an upper limit value of the predetermined range, the modified previously-calculated integrated value is set to be equal to the upper limit value.

19. The method according to claim 11, wherein
when the operating value is smaller than the target value and the previously-calculated integrated value is smaller than a lower limit value of the predetermined range, the modified previously-calculated integrated value is set to be equal to the lower limit value.

20. The method according to claim 11, wherein
the new operating value is calculated based on a sum of the first and second output values.

\* \* \* \* \*